US008876076B2

(12) United States Patent
Lee et al.

(10) Patent No.: US 8,876,076 B2
(45) Date of Patent: Nov. 4, 2014

(54) CRADLE FOR PORTABLE TERMINAL

(75) Inventors: Bong-Gun Lee, Seoul (KR);
Jong-Kwon Ko, Gyeonggi-do (KR)

(73) Assignee: Samsung Electronics Co., Ltd.,
Yeongtong-gu, Suwon-si, Gyeonggi-do (KR)

( * ) Notice: Subject to any disclaimer, the term of this patent is extended or adjusted under 35 U.S.C. 154(b) by 64 days.

(21) Appl. No.: 13/587,157

(22) Filed: Aug. 16, 2012

(65) Prior Publication Data

US 2013/0098854 A1    Apr. 25, 2013

(30) Foreign Application Priority Data

Oct. 24, 2011 (KR) .......................... 10-2011-0108500

(51) Int. Cl.
*A47B 91/00* (2006.01)
*F16M 13/02* (2006.01)
*F16M 11/10* (2006.01)
*F16M 13/00* (2006.01)

(52) U.S. Cl.
CPC .......... F16M 11/105 (2013.01); *F16M 2200/04* (2013.01); F16M 13/022 (2013.01); *F16M 2200/08* (2013.01); F16M 13/00 (2013.01); *Y10S 248/919* (2013.01)
USPC ........................... 248/346.2; 248/919; 211/26

(58) Field of Classification Search
USPC ............... 211/26; 248/346.2, 346.01, 346.03, 248/346.05, 346.06, 910, 917–923; 446/268, 269, 325, 326, 391, 396, 486
See application file for complete search history.

(56) References Cited

U.S. PATENT DOCUMENTS

| 3,247,823 | A | * | 4/1966 | Buck et al. ................... 116/63 R |
| 3,885,342 | A | * | 5/1975 | Morrison et al. ............... 446/97 |
| 4,362,402 | A | * | 12/1982 | Kallinke et al. ............... 368/317 |
| 6,112,698 | A | * | 9/2000 | Zelinger .................... 119/61.54 |
| 6,129,321 | A | * | 10/2000 | Minelli et al. ............. 248/183.1 |
| 6,439,530 | B1 | * | 8/2002 | Schoenfish et al. ...... 248/346.06 |
| 7,819,373 | B1 | * | 10/2010 | Tsai et al. .................. 248/346.2 |
| 7,997,554 | B2 | * | 8/2011 | Carnevali ...................... 248/363 |
| D687,835 | S | * | 8/2013 | Gittins ......................... D14/447 |
| 2009/0278015 | A1 | * | 11/2009 | Fan .......................... 248/346.06 |
| 2010/0007510 | A1 | * | 1/2010 | Ina et al. .................. 340/815.83 |

\* cited by examiner

*Primary Examiner* — Korie H Chan
(74) *Attorney, Agent, or Firm* — Cha & Reiter, LLC

(57) ABSTRACT

A cradle for stably cradling a portable terminal on a support surface in one of a plurality of possible orientations includes a case member having an open surface on which the portable terminal is to be cradled, a weighting member case disposed in an inner side of the case member along an edge of the open and a weighting member received movably inside the weighting member case, so that the weighting member is able to move under the influence of gravity to a lowest point inside the weighting member case irrespective of the orientation in which the case member is supported on the support surface. As the weighting member moves, the center of gravity of the cradle coupled with the portable terminal is moved to a position closest to the support surface on which the cradle is disposed, thereby maintaining a stable cradling state for the portable terminal.

13 Claims, 6 Drawing Sheets

CRADLE FOR PORTABLE TERMINAL

CLAIM OF PRIORITY

This application claims the benefit under 35 U.S.C. §119 (a) of a Korean Patent Application filed in the Korean Intellectual Property Office on Oct. 24, 2011 and assigned Ser. No. 10-2011-0108500, the entire disclosure of which is hereby incorporated by reference.

BACKGROUND OF THE INVENTION

1. Field of the Invention

The present invention generally relates to a portable terminal, and more particularly, to a cradle used to cradle the portable terminal on a substantially flat support surface, such as a table, etc.

2. Description of the Related Art

Portable terminal refers in general to an apparatus which, while carried by a user, provides a function of communication with another user or a base station. As the mobile communication technologies and information communication industry develops, the scope of services provided by the portable terminal has been rapidly expanded. For example, initial mobile communication services which had been limited to partner call, voice communication, etc., are now expanding to a moving image service, various ring tones, games, mobile banking, and so forth, and are rapidly expanding in popularity from young people to old people.

Such portable terminals include removable or built-in battery packets for supplying power during portable movement, and generally include separate charging cradles. A removable battery pack is generally separated from the portable terminal when it is to be charged on the charging cradle or the portable terminal including the removable battery pack is charged on when the portable terminal is placed on the charging cradle. Furthermore, the portable terminal including the built-in battery pack may be charged on a separate cradle for the portable terminal or it may be directly connected to a charging cable through an interface connector.

More recently, as the demand for multimedia services provided through portable terminals is increasing, and the power of portable terminals approaches the performance of a Personal Computer (PC), more generalized computer products such as a smart phone or a tablet PC, have emerged and various additional devices for extending the functions of the portable terminals have been proposed. For example, a cradle such as a docking station having a speaker device embedded therein may constitute a compact audio device by being coupled with a portable terminal. A tablet PC may extend an input device by being coupled with a keyboard of a docking type. When such a cradle is structured, a weighting member may be disposed in the cradle to stably maintain a cradling state/orientation. That is, when the portable terminal is mounted on the cradle, the height of the center of gravity of the cradle/portable terminal combination is increased due to the added weight of the portable terminal, thereby decreasing the stability of the combination. Accordingly, by using the weighting member, the change of the center of gravity of the cradle caused by the weight of the portable terminal is minimized.

FIGS. 1 and 2 are views for describing a cradle 10 for a portable terminal 19 according to a prior art embodiment. FIG. 1 shows a case member 11 of the cradle 10, and FIG. 2 shows a state in which the portable terminal 19 is mounted on the cradle 10. The case member 11 is in a pyramidal shape having an open surface on which the portable terminal 19 is mounted. A weighting member 15 is installed on an inner side of a bottom surface of the case member 11 so as to more securely hold the case member 10 in a stable manner on a flat plane such as a table, etc. The open surface of the case member 11 is closed by a front case 13, and the portable terminal 19 is mounted substantially on the front case 13.

Unless the weighting member 15 is installed, when the portable terminal 19 is mounted on the cradle 10, the center of gravity of the cradle 10 shifts (that is, it increases) so as to be substantially close to the center of gravity of the portable terminal 19. As a result, when the portable terminal 19 is mounted longitudinally (that is, its longer dimension is mounted vertically with respect to the flat plane) as shown in FIG. 2, the cradle 10 is likely to move easily, making it difficult to maintain a stable cradling state. On the other hand, the cradle 10 having the weighting member 15 installed therein can maintain a stable cradling state even when the portable terminal 19 is mounted longitudinally. Thus, due to the installation of the weighting member 15, the center of gravity of the cradle 10 can be maintained close to its bottom surface regardless of whether the portable terminal 19 is cradled on the cradle 10 or not.

To watch a moving image or video broadcast using the portable terminal 19, a user usually puts a side of the cradle 10 on a table as shown in FIG. 3. In this state, the center of gravity of the cradle 10 is still maintained close to the bottom surface of the cradle 10 (due to the fixed position of weighting member 15), yet the bottom surface is no longer positioned on the table and instead it is a side of the cradle 10. As a result, it is difficult to stably maintain a landscape (widthwise) view mode when the weighting member 15 is located at a fixed position on the bottom surface of the cradle 10.

SUMMARY OF THE INVENTION

An aspect of the present invention is to provide a cradle for stably cradling a portable terminal on a flat plane such as a table, etc., by changing its center of gravity according to an orientation in which the portable terminal is disposed on the flat plane.

According to an aspect of the present invention, there is provided a cradle for a portable terminal. The cradle includes a case member having an open surface on which the portable terminal is adapted to be cradled, a weighting member case disposed in an inner side of the case member along an edge of the open surface of at least the case member, and a weighting member received movably inside the weighting member case, in which the weighting member is able to move under the influence of gravity to a lowest point inside the weighting member case irrespective of the orientation in which the case member is supported on the support surface.

The weighting member case may have at least one of a pyramidal shape having an open surface on which the portable terminal is to be cradled, a truss structure in a pyramidal shape, and a frame shape.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION

Figure 1:
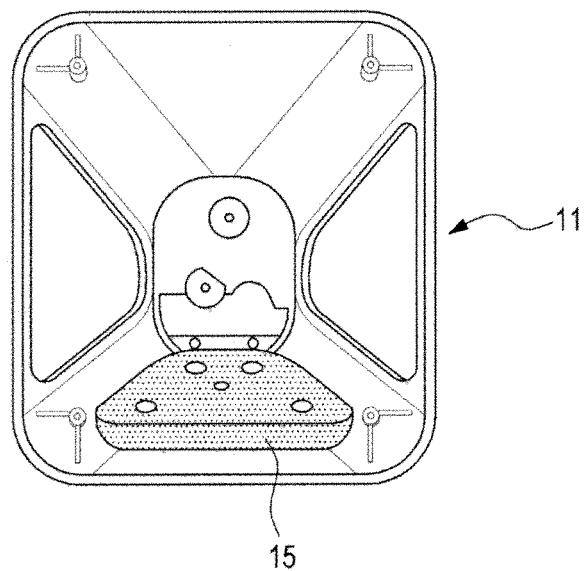
FIG. 1 illustrates a case member of a cradle according to an embodiment of conventional art.
Figure 2:
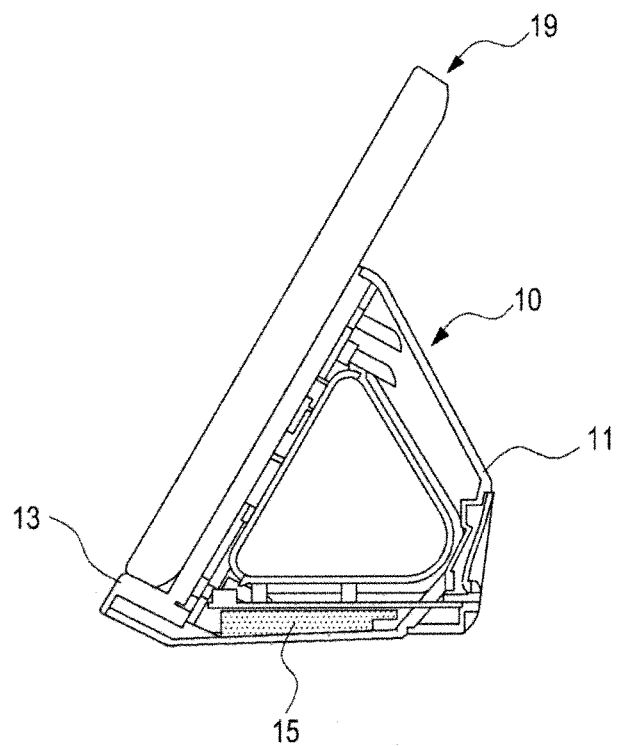
FIG. 2 illustrates a state where a portable terminal is cradled on a cradle including a case member shown in FIG. 1.
Figure 3:
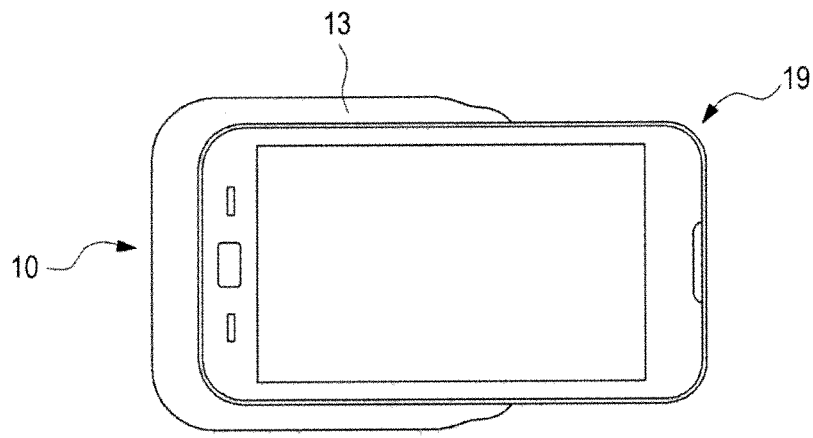
FIG. 3 illustrates a state where a portable terminal shown in FIG. 2 is cradled in a widthwise direction.

Hereinafter, exemplary embodiments of the present invention will be described in detail with reference to the accompanying drawings, where the same or similar elements are denoted by the same reference numerals even though they are depicted in different drawings. The detailed descriptions of functions and configurations incorporated herein that are well known to those of ordinary skill in the art are omitted to avoid unnecessarily obscuring of the present invention. Furthermore, it is noted that the description of the various exemplary embodiments do not describe every possible instance of the invention. Therefore, it should be understood that various changes may be made and equivalents may be substituted for various elements of the invention.

Figure 4:
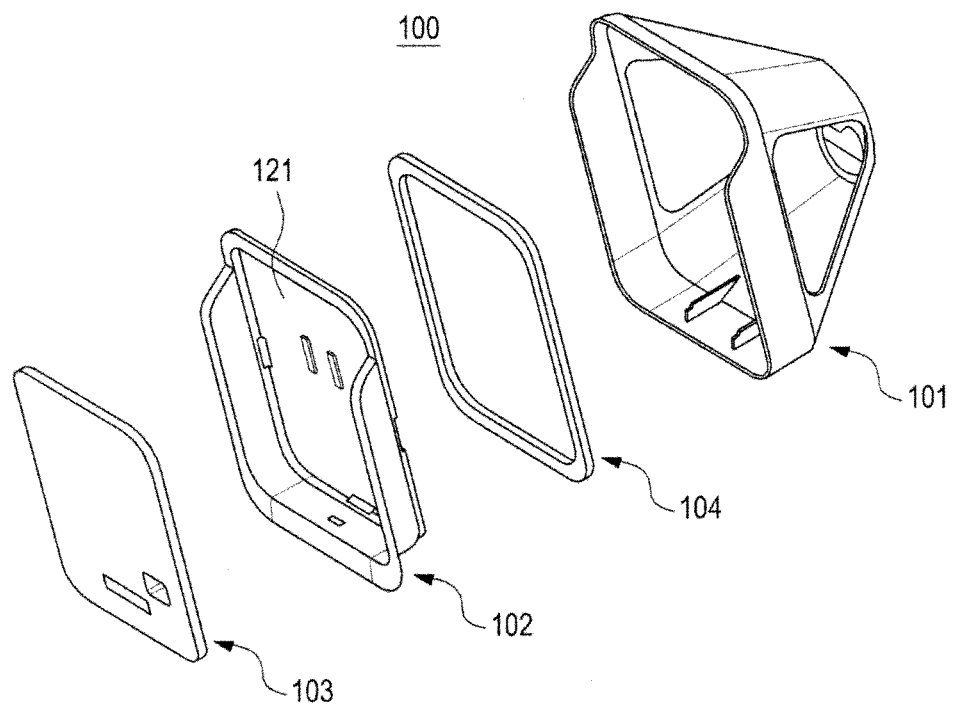
FIG. 4 is an exploded perspective illustration of a cradle for a portable terminal according to an embodiment of the present invention.
Figure 5:
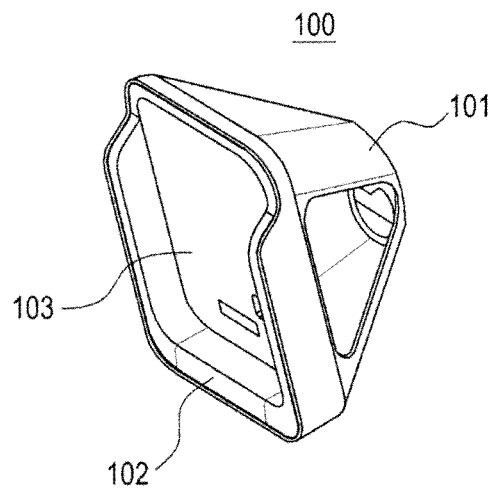
FIG. 5 is a coupled perspective illustration of a cradle shown in FIG. 4.

As shown in FIGS. 4 and 5, a cradle 100 for a portable terminal according to an embodiment of the present invention accommodates in a case member 101 a weighting member case 104 in which is a weighting member 149 (shown in FIG. 8) is received therein in a manner so as to allow it to move.

The case member 101 is an exterior component which forms a substantial exterior of the cradle 100. Preferably, a surface of the case member 101 on which the portable terminal is mounted is open. The case member 101 is substantially in a pyramidal shape and the open surface thereof is in a quadrangular shape, such that a separate front case 102 is coupled to the open surface of the case member 101, thus completing the external shape of the cradle 100.

The front case 102 includes a cradling recess 121 to which the portable terminal is coupled. The cradling recess 121 is coupled to the portable terminal in such a way to at least partially cover a back surface of the portable terminal and three continuous sides of the portable terminal In this state, a separate panel 103 may be disposed in the cradling recess 121. The panel 103 is interposed between the front case 102 and the portable terminal mounted in the cradling recess 121 to prevent the back surface of the portable terminal coupled to the cradling recess 121 from being damaged by friction. In the cradling recess 121 may be disposed an interface connector (not shown) for providing charging, cable connection with another device, and an output path for an audio or video signal provided by the portable terminal.

The weighting member case 104 limits a space in which the weighting member 149 can move, while receiving the weighting member 149. The weighting member case 104 is disposed such that a movement path of the weighting member 149 is formed along a perimeter edge of the open surface of at least the case member 101 in the inner side of the case member 101. The weighting member case 104 may be in various shapes, and in an embodiment of the present invention, the weighting member case 104 is in the shape of a frame corresponding to the shape of the perimeter of the open surface of the case member 101. The weighting member case 104 in the frame shape is coupled to the inner side of the case member 101 at the edge of the open surface of the case member 101. The weighting member case 104 is disposed in the inner side of the case member 101 and then the front case 102 is coupled to the case member 101, thus substantially completing the external shape of the cradle 100.

As mentioned previously, the weighting member case 104 may have the shape of a truss structure or a pyramidal shape as well as the frame shape.

Figure 6:
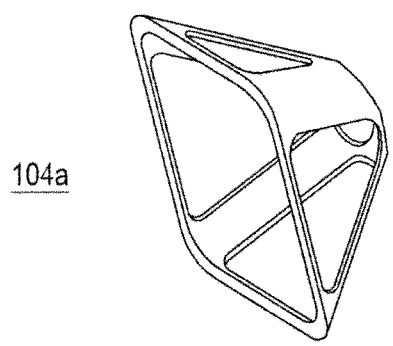
FIG. 6 is a perspective illustration of a weighting member case of a cradle shown in FIG. 4 according to another embodiment of the present invention.
Figure 7:
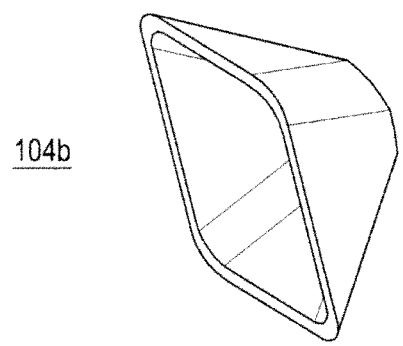
FIG. 7 is a perspective illustration of a weighting member case of a cradle shown in FIG. 4 according to another embodiment of the present invention.

FIG. 6 shows a weighting member case 104a having the shape of a truss structure, and FIG. 7 shows a weighting member case 104b having a pyramidal shape. The weighting member case 104a having the truss structure shape is overall similar to the pyramidal shape. The weighting member case 104a having the truss structure shape and the weighting member case 104b having the pyramidal shape substantially have external shapes matching the shape of the inner surface of the case member 101. It can be seen that the weighting member case 104 in the frame shape disclosed in the foregoing embodiment forms a substantial part of the weighting member case 104a having the truss structure shape or the weighting member case 104b having the pyramidal shape. The weighting member cases 104, 104a, and 104b receive the weighting member 149 therein and also provide an interior space which allows for movement of the weighting member 149 within the weighting member case 104, 104a or 104b.

The weighting member cases 104, 104a, and 104b have open surfaces on which the portable terminal is mounted, respectively, but such mounting surfaces may also be manufactured as closed surfaces. However, if a circuit device or a speaker phone is disposed for use in the cradle 100, the shape of the mounting surfaces may be changed appropriately by considering such use.

The weighting member 149 may be formed of one of water, a viscous liquid such as oil, a powder, and a plurality of weighted beads, such as metallic balls. Since the weighting member 149 is formed of a movable material, it can move/flow freely inside the weighting member case 104. Therefore, although the cradle 100 may be disposed on a flat plane in any orientation, the weighting member 149 moves/flows to the lowest point in case 104 as a result of the influence of gravity, i.e., to a position closest to the flat plane on which the cradle 100 is disposed. Since the center of gravity of the cradle 100 is able to shift so as to always be positioned closer to the flat plane on which the cradle 100 is put, the cradle 100 is self-adjusting so as to maintain a stable cradling state even when the cradle 100 is disposed in any orientation. It is noted that the higher the specific gravity of the weighting member 149, the smaller the volume of weighting member 149 which is needed to stably maintain the center of gravity of the cradle 100.

It can be easily understood by those of ordinary skill in the art that the 'flat plane' on which the cradle 100 is disposed refers to not only a plane which is substantially perpendicular to the direction of gravity, but also a plane which is inclined with respect to the direction of gravity.

Figure 8:
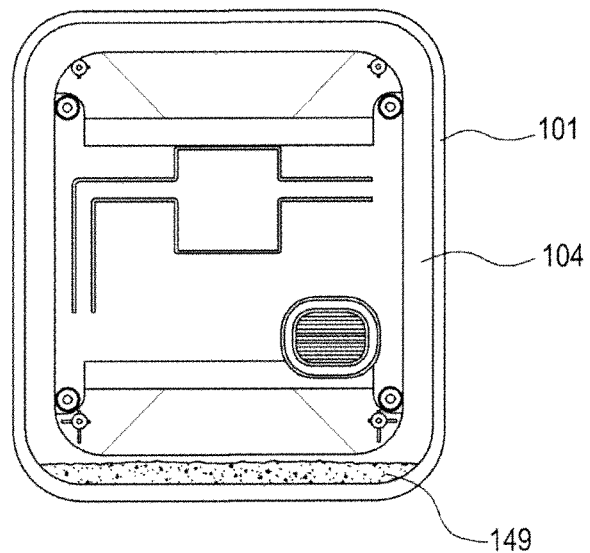
FIGS. 8 through 10 are illustrations for describing movement of a weighting member according to cradling directions of a cradle shown in FIG. 4.
Figure 9:
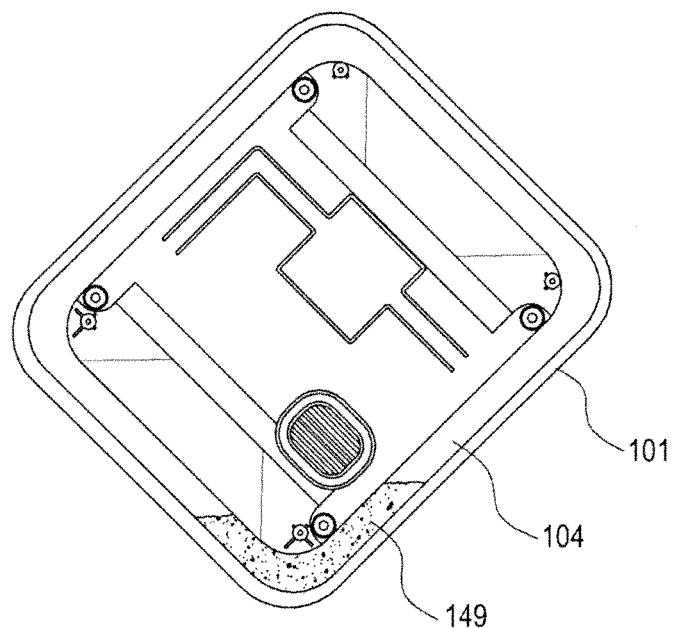
Figure 10:
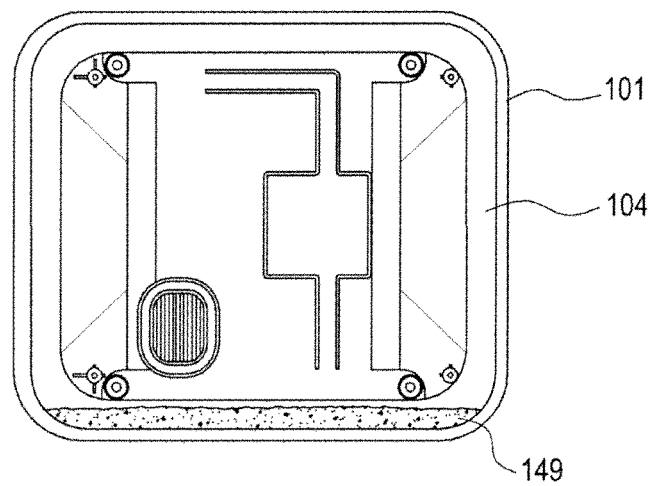
Figure 11:
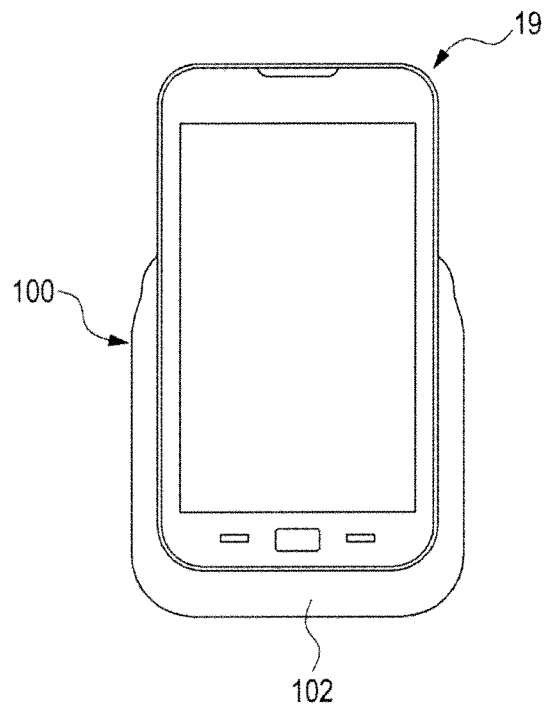
FIG. 11 illustrates a state where a portable terminal is cradled on a cradle shown in FIG. 4.
Figure 12:
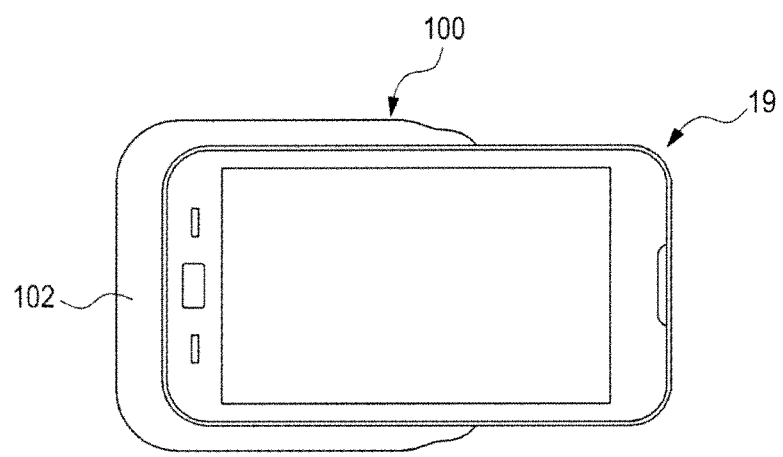
FIG. 12 illustrates a state where a portable terminal shown in FIG. 11 is cradled long in a widthwise direction.

FIGS. 8 through 10 show movement of the weighting member 149 according to various cradling orientations of the cradle 100, FIG. 11 shows a state where the portable terminal 19 is mounted on the cradle 100 and disposed longitudinally (i.e., the long dimension of the portable terminal 19 is oriented vertically, so as to extend perpendicular from the flat plane) on the cradle 100, and FIG. 12 shows a state where the portable terminal 19 mounted on the cradle 100 is disposed so that its long dimension is in a widthwise direction (i.e., a landscape orientation, which is parallel to the flat plane).

As shown in FIGS. 8 through 10, although the cradle 100 is disposed in any orientation, the weighting member 149 moves/flows in the weighting member case 104 to a position where it will be closest to the flat plane on which the cradle 100 is disposed. By forming the weighting member 149 with a material having a relatively high specific gravity (as compared with the weight of a conventional portable terminal 19), the center of gravity of the cradle 100 is prevented from being perceptively increased even when the portable terminal 19 is mounted on the cradle 100.

Accordingly, when the portable terminal 19 is mounted on the cradle 100 as shown in FIGS. 11 and 12, an increase in the height of the center of gravity of the cradle 100 can be minimized. In this way, although a display device of the portable terminal 19 is disposed long in any orientation, e.g., in a lengthwise, widthwise or any angular direction therebetween, the weighting member 149 moves/flows such that the center of gravity of the cradle 100 on which the portable terminal 19 is mounted can be maintained close to the flat surface. In other words, when the cradle 100 on which the portable terminal 19 is mounted is disposed on the flat plane in any orientation, it can be stably cradled on the flat plane.

As can be appreciated from the foregoing description, according to the present invention, as the weighting member moves, the center of gravity of the cradle to which the portable terminal is coupled also moves to the lowest point in the direction of gravity, that is, a position closest to the flat plane on which the cradle is disposed, thereby maintaining a stable cradling state. Accordingly, although a display device of the portable terminal is disposed long in any direction, e.g., in a lengthwise or widthwise direction, the stable cradling state can be maintained.

While the invention has been shown and described with reference to exemplary embodiments thereof, it will be understood by those of ordinary skill in the art that various changes in form and details may be made therein without departing from the scope of the invention, which is defined only by the appended claims and their equivalents.

What is claimed is:

1. A cradle for cradling a portable terminal on a support surface in a desired one orientation of a plurality of possible orientations, the cradle comprising:
   a case member having an open surface with a shape adapted to cradle the portable terminal;
   a weighting member case disposed in an inner side of the case member along an edge of the open surface of at least the case member; and
   a weighting member received movably inside the weighting member case,
   wherein the weighting member moves within a perimeter of the weighting member case under an influence of gravity so as to be positioned at a lowest point inside the weighting member case irrespective of the orientation in which the case member is supported on the support surface.

2. The cradle of claim 1, wherein the weighting member case has a pyramidal shape with an open surface adapted to cradle the portable terminal.

3. The cradle of claim 1, wherein the weighting member case is a truss structure having a pyramidal shape.

4. The cradle of claim 1, wherein the weighting member case is a frame having a quadrangular shape.

5. The cradle of claim 1, wherein the open surface of the case member has a quadrangular shape, and the case member has a pyramidal shape.

6. The cradle of claim 5, wherein the weighting member case has an open pyramidal surface adapted to cradle the portable terminal.

7. The cradle of claim 5, wherein the weighting member case is a truss structure having a pyramidal shape.

8. The cradle of claim 1, wherein the weighting member is formed of at least one of a liquid, a metallic powder, and metallic balls.

9. The cradle of claim 1, further comprising a front case which is coupled to the case member to close the open surface of the case member, wherein the front case is adapted to have the portable terminal cradled thereon.

10. The cradle of claim 9, further comprising a cradling recess formed in an outer surface of the front case, which recess is adapted to partially receive the portable terminal therein.

11. The cradle of claim 9, further comprising a panel mounted on the front case to be interposed between the front case and a portable terminal to be mounted on the front case.

12. A method for cradling a portable terminal in a desired orientation on a support surface, where the cradle includes a case member having an open surface with a shape adapted to cradle the portable terminal and a weighting member case disposed in an inner side of the case member along an edge of the open surface of at least the case member, comprising:
   providing a movable weighting member inside the weighting member case, so that the weighting member moves within a perimeter of the weighting member case under the influence of gravity so as to be positioned at a lowest point inside the weighting member case irrespective of the orientation in which the case member is supported on the support surface.

13. The method of claim 12, comprising forming the weighting member of at least one of a liquid, a metallic powder, and a plurality of metallic balls.

* * * * *